(12) United States Patent
Wakeford (10) Patent No.: US 10,198,901 B1
(45) Date of Patent: Feb. 5, 2019

(54) SYSTEMS AND METHODS FOR FACILITATING GROUP GAMEPLAY IN AN ONLINE GAME

(71) Applicant: ELECTRONIC ARTS INC., Redwood City, CA (US)

(72) Inventor: Kent Wakeford, Hillsborough, CA (US)

(73) Assignee: Electronic Arts Inc., Redwood City, CA (US)

( * ) Notice: Subject to any disclaimer, the term of this patent is extended or adjusted under 35 U.S.C. 154(b) by 347 days.

(21) Appl. No.: 15/232,706

(22) Filed: Aug. 9, 2016

(51) Int. Cl.
| | |
|---|---|
| G07F 17/32 | (2006.01) |
| A63F 13/58 | (2014.01) |
| A63F 13/20 | (2014.01) |
| A63F 13/79 | (2014.01) |
| A63F 13/35 | (2014.01) |
| A63F 13/335 | (2014.01) |
| A63F 13/798 | (2014.01) |
| A63F 13/847 | (2014.01) |

(52) U.S. Cl.
CPC .......... *G07F 17/3225* (2013.01); *A63F 13/20* (2014.09); *A63F 13/335* (2014.09); *A63F 13/35* (2014.09); *A63F 13/58* (2014.09); *A63F 13/79* (2014.09); *A63F 13/798* (2014.09); *A63F 13/847* (2014.09); *G07F 17/3244* (2013.01); *G07F 17/3274* (2013.01); *A63F 2300/407* (2013.01); *A63F 2300/5526* (2013.01); *A63F 2300/5546* (2013.01)

(58) Field of Classification Search
CPC ...................................................... G07F 17/34
See application file for complete search history.

(56) References Cited

U.S. PATENT DOCUMENTS

| | | | |
|---|---|---|---|
| 7,806,758 B2 | 10/2010 | Van Luchene | |
| 8,267,794 B2 | 9/2012 | VanLuchene | |
| 9,352,217 B1* | 5/2016 | Curtis | G07F 17/3255 |
| 2007/0087823 A1 | 4/2007 | Walker | |
| 2008/0045341 A1 | 2/2008 | Englman | |
| 2011/0201415 A1* | 8/2011 | Gagner | G06Q 50/34 |
| | | | 463/25 |
| 2012/0315993 A1* | 12/2012 | Dumont | G07F 17/3225 |
| | | | 463/42 |
| 2015/0005074 A1 | 1/2015 | Moshayedi | |
| 2015/0057084 A1* | 2/2015 | Lin | A63F 13/795 |
| | | | 463/42 |

FOREIGN PATENT DOCUMENTS

WO      1998051384      11/1998

\* cited by examiner

*Primary Examiner* — Robert T Clarke, Jr.
(74) *Attorney, Agent, or Firm* — Knobbe Martens Olson & Bear LLP (57) ABSTRACT

A system and method for facilitating group gameplay in an online game may include executing an game instance of an online game. User selected criteria may define values of one or more parameters associated with the users that may be eligible to receive benefit offers to participate in cooperative gameplay with groups towards common objectives. The benefit offers may include reward enhancements. Synchronous gameplay by the users with the groups towards one or more objectives may be facilitated. Rewards for individual ones of the users may be determined based on one or more of: whether the common objectives are successfully achieved, individual performances of the users, wager information, reward enhancements, and/or other information.

24 Claims, 3 Drawing Sheets

SYSTEMS AND METHODS FOR FACILITATING GROUP GAMEPLAY IN AN ONLINE GAME

FIELD OF THE DISCLOSURE

This disclosure relates to facilitating group gameplay in an online game.

BACKGROUND

Users may participate cooperative gameplay in online games. Users may participate in cooperative gameplay with persistent groups within the game and/or non-persistent groups within the game. Cooperative gameplay may increase a user's enjoyment and/or engagement with the online game because they are able to participate in gameplay with other users. Users within online games may have varying abilities, skills, virtual items, records, and/or reputations.

SUMMARY

One aspect of the disclosure relates to a system for facilitating group gameplay in an online game. In some implementations, the system may enable groups and/or affiliations within an online game to recruit and/or encourage users satisfying certain requirements to participate in gameplay with the group. User selected criteria may define one or more parameters associated with users. In some implementations, the user selected criteria may define parameters associated with users eligible to receive a benefit offer to participate in cooperative gameplay with a given group of users. The benefit offers may include reward enhancements to be provided to the individual users in exchange for their participation in the cooperative gameplay with the given group. The benefit offers may be transmitted to one or more users. Responsive to one or more users accepting the benefit offers, they may participate in the cooperative gameplay with the given group of users. One or more of the users may place wagers on the group gameplay based on whether or not a group will successfully achieve one or more common objectives. Individual performances of the users in the group may be monitored during the group gameplay (e.g., cooperative gameplay). They system may determine individual rewards for individual ones of the users based on one or more of: whether one or more of the common objectives are successfully achieved by the group, the individual performances of the users in the group, the reward enhancements for the individual users, the wagers made or not made by the individual users, and/or other information. As such, a user within a group and/or forming a group may define user selected criteria to recruit specific users to participate in cooperative gameplay with the group. The user and/or group may entice the users to accept the offers by providing reward enhancements. And, the users satisfying the user selected criteria and/or receiving the offers to participate in the gameplay with the group may be enticed to accept the offers by the reward enhancements that may, along with any wager(s) they make and/or their performance, affect the reward they receive for participating in the cooperative gameplay.

In some implementations, the system may comprise one or more physical processors configured to execute machine-readable instructions to implement system components. The system components may include one or more of a game component, a user component, a group component, a wager component, a performance component, a reward component, and/or other components.

The game component may be configured to execute a game instance of the online game. The game component may use the game instance to generate game state information. The game state information may be transmitted to client computing platforms over a network. The game state information may facilitate presentation of views of the online game to the users via the client computing platforms. Execution of the game instance may include performing operations in the game instance in response to commands received over the network from the client computing platforms to enable interaction by the users with the online game and/or each other. The online game may include one or more objectives to be accomplished through cooperative gameplay by the users. The one or more objectives may be common objectives shared by users within a group participating in the cooperative gameplay together. The cooperative gameplay by the users may include group gameplay such that the users participate in the online game together towards one or more common objectives (e.g., goals).

The user component may be configured to access and/or manage one or more user accounts and/or other user information associated with users of the system. The user accounts may include, for example, information identifying users within the virtual space. The user accounts may include parameter information related to characteristics of a user's gameplay and/or the history of a user's gameplay. The parameter information may include information used to determine whether one or more parameters associated with the users satisfy user selected criteria defined to recruit users to participate in cooperative gameplay with a group.

The group component may be configured to receive user selected criteria from client computing platforms associated with the users. The user selected criteria may be used to identify which users to provide benefit offers to join the group and/or participate in cooperative gameplay with the group. The user selected criteria may define values of one or more parameters associated with users that are eligible to receive benefit offers and/or participate in the cooperative gameplay as a group. The parameters defined by the user selected criteria may include one or more of a quantity of successful outcomes, a player progress metric, a character feature, an inventory parameter, and/or other parameters. The quantity of successful outcomes may include one or more of a number of kills, wins, and/or other successful outcomes associated with a user and/or character. A player progress metric may indicate a user's progress in the game. For example, the player progress metric may include one or more of a level of user, a level of XP of a user, and/or other player progress metrics. A character feature may be a characteristic and/or classification of a given character associated with and/or controlled by a user. For example, a character feature may include one or more of a type or classification of character, rarity, reputation, ability/skill, and/or other character features. An inventory parameter may describe one or more items associated with a given user's inventory. By way of example, an inventory parameter may include one or more of a virtual currency, a resource, a virtual item, an entity, and/or other object owned and/or controlled by the given user.

The group component may be configured to identify one or more users that satisfy the user selected criteria. The group component may identify the users that satisfy the user selected criteria based on one or more of the user values for the user parameters included in the parameter information in the user accounts satisfying one or more values defined by the user selected criteria.

The group component may be configured to effectuate transmission of one or more benefit offers. The benefit offers may be offers to participate in cooperative gameplay with groups towards common objectives. The benefit offers may be transmitted to one or more users (e.g., the client computing platforms associated with the users) that satisfy the user selected criteria. For example, a first offer to participate in the cooperative gameplay towards the first common objective with the first group may be transmitted to a second client computing platform associated with the second user. The benefit offers may include offers to join a temporary group created for the purpose of multiple users participating in cooperative gameplay towards one or more common objectives; and/or offers to join a previously established and/or persistent group within the online game (e.g., an affiliation).

The benefit offers may include reward enhancements for the users. The reward enhancements may include one or more of a bonus reward, a multiplier, an increased percentage and/or share of a group reward, an increased level and/or type of reward, a rare reward, a targeted reward, and/or other reward enhancements. In some implementations, the first offer may include a first reward enhancement for the second user.

The group component may be configured to receive acceptance information. The acceptance information may indicate acceptances of individual ones of the benefit offers to participate in the cooperative gameplay with the groups towards the common objectives. The acceptance information may indicate acceptance of the first offer by the second user.

The wager component may be configured to receive wager information from the users participating in the cooperative gameplay with the groups towards the common objectives. The wager information may indicate whether or not the users placed wagers. The wagers may include amounts of consideration placed at risk based on whether or not the groups will successfully achieve one or more of the common objectives. The wager information may include one or more amounts of the wagers. The wager information may indicate the second user placed a first amount of consideration at risk in a first wager based on whether or not the first group will successfully achieve the first common objective.

The game component may be configured to facilitate cooperative gameplay by the users with the groups towards common objectives. Facilitating cooperative gameplay by the users with the groups may include executing a game instance of the game the multiple users within a group may participate in.

The performance component may be configured to monitor individual performances of the users during their participation in the cooperative gameplay with the groups towards the common objectives. The performance information may include one or more of individual performance statistics, individual accomplishments, group statistics, group accomplishments, group wins, group losses, and/or other performance information. The individual performances may be quantified by one or more performance metrics.

The reward component may be configured to determine rewards for individual ones of the users. The rewards may be determined based on whether the common objectives are successfully achieved, the individual performances, the wager information, the reward enhancements, and/or other factors. As such, the individual rewards may reflect the individual users performance, wager information for the individual users, and/or the reward enhancements provided to the individual users consideration for their participation in the cooperative gameplay with the group.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
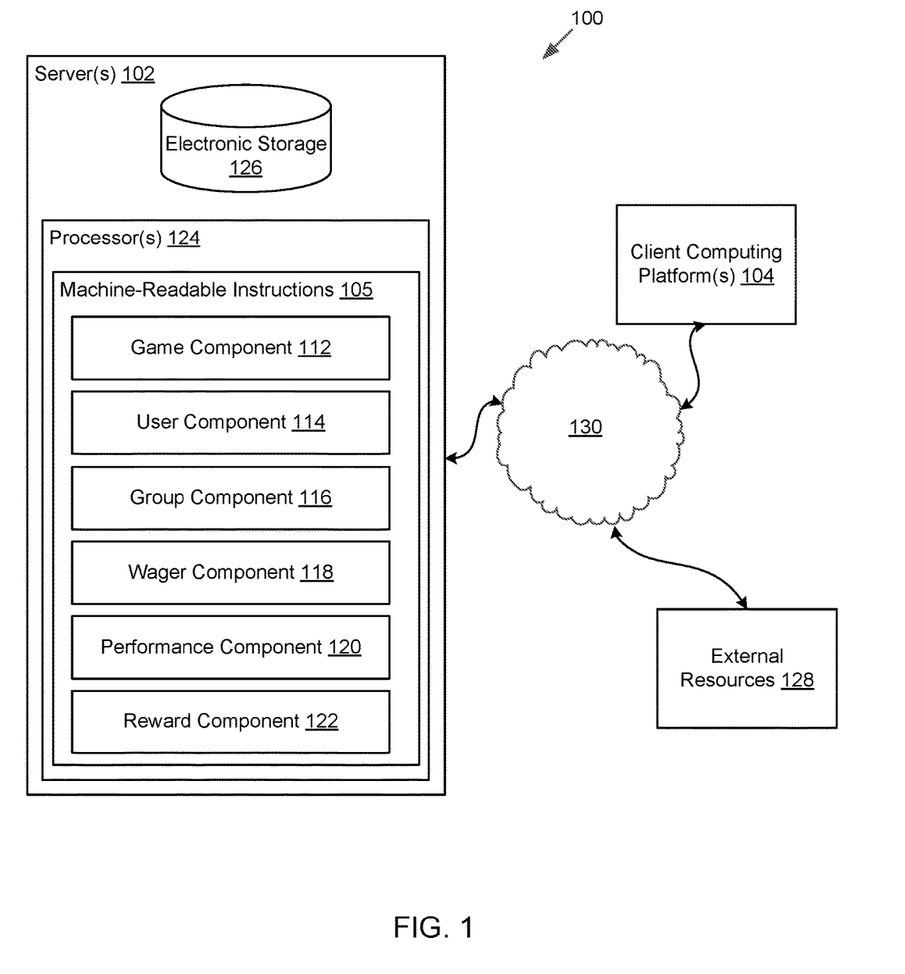
FIG. 1 illustrates a system configured to facilitate group gameplay in an online game, in accordance with one or more implementations.

FIG. 1 illustrates a system 100 configured to facilitate group gameplay in an online game, in accordance with one or more implementations. The online game may take place within a virtual space. User participation in the online game may include participating in cooperative gameplay as groups of users towards one or more common objectives in the online game.

System 100 may be configured to host the online game over a network. In some implementations system 100 may include one or more server(s) 102. One or more of server(s) 102 may be configured to host the online game. The servers 102 may be configured to communicate with one or more client computing platforms 104 according to a client/server architecture, and with each other. The users may access system 100 and/or the game spaces associated with the online games via client computing platforms 104. As shown, a given server 102, such as the server 102 shown, may comprise a processor 124 configured to execute machine-readable instructions to implement system components. The computer program components may include one or more of a game component 112, a user component 114, a group component 116, a wager component 118, a performance component 120, a reward component 122, and/or other components.

In FIG. 1, executing a game instance of the online game may include hosting the online game over a network 130, such as the Internet. A server 102 may include one or more processors 124 configured to execute machine-readable instructions 106 to facilitate user log-ins to a user account of an online game taking place in the virtual space. The machine-readable instructions 106 may include one or more components for implementing a game instance of an online game and to facilitate the participation of one or more users in the virtual space and/or the online game. The machine-readable instructions 106 may use the game instance to generate game state information for facilitating presentation of views of the online game to the users via client computing platforms 104. Execution of the game instance may include performing operations in the game instance in response to commands received over the network from client computing platforms 104 to enable interaction by the users with the online game and/or each other. The machine-readable instructions 106 may include one or more of a game component 112, a user component 114, a group component 116, a wager component 118, a performance component 120, a reward component 122, and/or other components.

The server 102 may be configured to communicate with one or more client computing platforms 104 according to client/server architecture, and/or other communication scheme. The client computing platforms 104 may include, for example, a cellular telephone, a smartphone, a laptop, a tablet computer, a desktop computer, a television set-top box, smart TV, a gaming console, and/or other platform. The users may access system 100 and/or the online game via the client computing platforms 104 by logging in to their user accounts.

In some implementations, one or more features and functions of server 102 may be attributed to one or more client computing platforms 104. By way of non-limiting example, individual ones of the client computing platforms 104 may include machine-readable instructions comprising the same or similar components as machine-readable instructions 106 of server 102. The client computing platforms 104 may be configured to locally implement a game instance of the online game and/or facilitate participation of one or more users in the online game.

Game component 112 may be configured to execute a game instance of the online game. Game component 112 may use the game instance to generate game state information. The game state information may be transmitted to client computing platforms 104 over a network 130. The game state information may facilitate presentation of views of the online game to the users via the client computing platforms. Execution of the game instance may include performing operations in the game instance in response to commands received over the network 130 from the client computing platforms 104 to enable interaction by the users with the online game and/or each other. The online game may include one or more objectives to be accomplished through cooperative gameplay by the users. The one or more objectives may be common objectives shared by users within a group participating in the cooperative gameplay together. The cooperative gameplay by the users may include group gameplay such that the users participate in the online game together towards one or more common goals. In some implementations, the individual users may perform one or more individual tasks towards an overarching common goal. The individual tasks may vary and/or be different based on the user assigned an/or performing the individual tasks. The cooperative gameplay may include one or more of player vs. player (e.g., group vs. group, real vs. realm, etc.) gameplay; player vs. environment (e.g., group vs. environment) gameplay, and/other types of gameplay.

The cooperative gameplay may include one or more limited-time events within the online game. The limited-time events may have a beginning, an end, and/or a duration. The limited time-events may be associated with one or more common objectives such that the users may participate in the limited-time events as a group. In some implementations, an objective of the limited-time events may be that the group successfully achieve a common objective within the duration, prior to the end of the limited-time event.

By way of non-limiting example, the objectives may include one or more of: defeating another group and/or user characters associated with the group in battle and/or combat, defeating a boss, capturing a virtual space entity and/or item, destroying a virtual space entity and/or item, completing a challenge, obtaining a virtual item and/or entity, obtaining a virtual area, building a virtual entity, and/or other game objectives.

The game component 112 may be configured to implement a game instance of the online game executed by the computer components to determine state of the online game and/or virtual space in which the online game takes place. The state may be communicated (e.g., via streaming visual data, object/position data, and/or other state information) from server 102 to client computing platforms 104 for presentation on displays of the client computing platforms 104. The state determined and transmitted to a given computing platform 104 may correspond to a view for a game entity being controlled by user input via input devices (e.g., a controller, touch-responsive display screen) at the given computing platform 104. The state determined and presented to a given computing platform 104 may correspond to a location in the virtual space (e.g., location in the game). The view described by the state for the given computing platform 104 may correspond, for example, to the location from which the view is taken, the location the view depicts, and/or other locations, a zoom ratio, a dimensionality of objects, a point-of-view, and/or parameters of the view. One or more of the view parameters may be selectable by the users.

An instance of the online game may include a virtual space. The virtual space may comprise a simulated space that is accessible to users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In some instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which the state of the virtual space is determined by game component 112 is not intended to be limiting. The game component 112 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the online game executed by game component 112, users may provide input to control game entities, simulated physical phenomena (e.g., wind, rain, earthquakes, and/or other phenomena), and/or other elements within the virtual space to interact with the virtual space and/or each other. The game entities may include virtual characters such as avatars. A game entity may be controlled by the user with which it is associated. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual items and/or currency that the user can use (e.g., by manipulation of a game entity or other user-controlled element, and/or other items) within the virtual space.

The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through game component 112) and/or through communications which are external to the system 100 (e.g., text messaging services associated with the client computing platforms 104).

The users may participate in the instance of the virtual space by effectuating one or more timed in-game tasks, as presented herein. Users may provide input via a client computing platform 104 to initiate a timed in-game task. By way of non-limiting example, a user may tap a virtual button displayed on a touch-sensitive display of a client computing platform 104 to accept an offer to participate in cooperative gameplay with a group. User participation in cooperative game play with groups may be initiated in other ways.

The instance of the online game and/or the virtual space in which the online takes place may be persistent. That is, the online game and/or virtual space may continue on whether or not individual players are currently logged in and/or participating in the online game. A player who logs out of the online game and/or virtual space and then logs back in some time later may find the online game and/or virtual space has been changed through the interactions of other players with the virtual space during the time the player was logged out. These changes may include changes to the simulated physical space, changes in the player's inventory, changes in other players' inventories, changes in wait periods of timed in-game tasks, changes experienced by non-player characters, changes to the virtual items available for use in the online game, and/or other changes.

The user component 114 may be configured to access and/or manage one or more user accounts and/or other user information associated with users of the system 100. The one or more user accounts may include information stored by server 102, one or more of the client computing platforms 104, and/or other storage locations. The user account may include, for example, information identifying users within the virtual space, security login information, virtual inventory information, parameter information, subscription information, virtual (or real) currency account information, information regarding in-game tasks, relationship information, virtual space usage information, participation information, demographic information associated with users, interaction history among users in the virtual space, information stated by users, browsing history of users, a computing platform identification associated with a user, a phone number associated with a user, and/or other information related to users.

In some implementations, information identifying users may include a username or handle, a number, an identifier, and/or other identifying information. Security login information may include a login code, password, and/or other information. Virtual (or real) currency account information may include information related to currency held in credit for a user. Virtual inventory information may include virtual inventories associated with the users that include one or more virtual items available for the users in the virtual space and/or online game. Relationship information may include information related to relationships between users in the virtual space.

Parameter information may include information related to characteristics of a user's gameplay and/or the history of a user's gameplay. By way of non-limiting example, the parameter information may include one or more of a quantity of successful outcomes, a player progress metric, a character feature, an inventory parameter, and/or other parameters associated with a user. By way of non-limiting example, the parameter information may indicate one or more of: a reputation of the user, skills of the user, a level of the user, abilities of the user, a quantity of wins and/or kills achieved by the user, one or more accomplishments of the user, one or more abilities of a user, resources and/or virtual items associated with and/or belonging to the user, a player character associated with and/or controlled by the user, and/or other information related to characteristics of a user's gameplay and/or the history of a user's gameplay. The parameter information may include information used to determine whether one or more parameters associated with the users satisfy the user selected criteria. The parameter information may include values associated with the user for one or more of the parameters. The values may include: a numerical expression of a parameter associated with the users that may comprise one or more of a quantity, a point, amount, score, rank, ratings, grades, degree, true/false (e.g., a non-zero value indicating true and zero indicating false) or other type of numerical value; a descriptive expression of magnitude and/or information associated with a parameter for the user such as popular, strong, weak, well-known, influential, not influential, level value, advanced, beginner, a resource description, an ability description, and/or other description; and/or other values.

In some implementations, the user component 114 may be configured such that user accounts include virtual space (and/or online game) usage information. The virtual space (and/or online game) usage information may convey a frequency of log-in, a velocity of log-in, an amount of times a user logged in to a user account, and/or other information. In some implementations, the usage information may convey whether a user is currently logged in or logged out. Usage information may include other information.

In some implementations, the user component 114 may be configured to determine user account activity based on the usage information and/or other information. By way of non-limiting example, the user component 114 may be configured to express user account activity numerically, descriptively, progressively, pictorially, and/or expression of user account activity.

In some implementations, usage information may include information conveying times of day a user may be logged in or out, in-game events that may trigger a user to log in and/or out, external events that may trigger a user to log in or out, and/or other information. For example, in-game and/or external events may be events that may take the user away from participation in an online game, may drive user participation in the online game, and/or may illicit other behavior.

In some implementations, the user component 114 may be configured such that user accounts may include participation information conveying on-going activities of the user accounts. By way of non-limiting example, the participation information may include information indicating entries and/or selections of virtual items within the online game by a user of a user account, social activity, and/or other information. Social activity within the virtual space may correspond to one or more social interactions by a user with one or more other users of the virtual space and/or online game. Social interactions may include, for example, in-game communications with one or more other users, participating in gameplay with one or more other users (e.g., cooperative gameplay of a group of users towards a common objective and/or other multiplayer gameplay), and/or other social interactions a user may engage in with other users of the virtual space and/or online game. Participation information may include affiliation information. The affiliation information may indicate one or more affiliations the user is a member of and/or has participated in gameplay with.

Group component 116 may be configured to receive user selected criteria from client computing platforms associated with the users. The user selected criteria may indicate which users may be provided offers to participate in gameplay as a group. The user selected criteria may define values of one or more parameters associated with users. The user selected criteria may define values of one or more parameters associated with users that are eligible to participate in the cooperative gameplay as a group. The parameters defined by the user selected criteria may include one or more of a quantity of successful outcomes, a player progress metric, a character feature, an inventory parameter, and/or other parameters. The quantity of successful outcomes may include one or more of a number of kills, wins, and/or other successful outcomes associated with a user and/or character. A player progress metric may indicate a user's progress in the game. For example, the player progress metric may include one or more of a level of user, a level of XP of a user, and/or other player progress metrics. A character feature may be a characteristics and/or classification of a given character associated with and/or controlled by a user. For example, a character feature may include one or more of a type or classification of character, rarity, reputation, ability/skill, and/or other character features. An inventory parameter may describe one or more items associated with a given user's inventory. By way of example, an inventory parameter may include one or more of a virtual currency, a resource, a virtual item, an entity, and/or other object owned and/or controlled by the given user. The parameter information in the user accounts accessed and/or managed by user component 114 may indicate user values for the one or more parameters associated with the users. A given user may satisfy the user selected criteria responsive to their user values for the one or more parameters aligning, matching, fitting within a range, and/or otherwise satisfying the values defined by the user selected criteria. As such, the user selected criteria may be used to identify users to join the group. The user selected criteria may be selected by one or more users within a group and/or initiating formation of a group.

In some implementations, the user selected criteria may be received from a first client computing platform associated with a first user. The user selected criteria may be received over a network. The first user may belong to a first group within the online game. In some implementations, the first user may initiate formation of the first group. Group component 116 may be configured to receive a request to form the first group from the first client computing platform associated with the first user. The first user may initiate formation of the first group such that the first user is able to select the user selected criteria and/or one or more characteristics of the first group. The one or more characteristics of the first group may include one or more of a game objective (e.g., one or more of the common objectives), a size of the first group, a duration of the first group (e.g., whether the first group is persistent within the online game or temporary), a name of the first group, an icon and/or image associated with the first group, a privacy of the first group (e.g., an open group or a closed group), one or more restrictions of the first group (e.g., restricting the users that may join and/or request to join the first group etc.). Initiating formation of a group may enable the user to select the user selected criteria by define acceptable values and/or ranges of values of one or more parameters associated with users eligible to participate in the group.

In some implementations, group component 116 may be configured to manage and/or form groups of users that may participate in cooperative gameplay towards one of more common objectives. The cooperative gameplay may include synchronous gameplay, asynchronous gameplay, semi-synchronous gameplay, and/or other types of gameplay. The one or more common objectives may include a first common objective. The groups may include multiple users participating in the cooperative gameplay. In some implementations, the multiple users within a given group may participate in cooperative (and/or synchronous, asynchronous, and/or semi-synchronous) gameplay as a group towards the one or more common objectives. The multiple users may include a first user, a second user, a third user, and/or one or more other users. The groups may include a temporary group, an affiliation, and/or other types of groups. A temporary group may be formed for the purposed of participating in cooperative gameplay towards one or more common objectives such that responsive to the common objectives being successfully achieved or not achieved, the temporary group ceases to exist. An affiliation may comprise a persistent group of users within an online game with a relationship having a functional impact on gameplay within the online game. An affiliation may include users having persistent relationships across multiple sessions and/or tasks, and/or without a set objective.

An affiliation may include one or more of an alliance, a guild, a faction, a club, an association, a group, a crew, a band, a clan, a family, fellowship, a gang, a league, a partnership, a syndicate, a society, a tribe, a troop, a company, and/or other affiliations that include a discrete group of individuals. Affiliations may be established based on affiliation requests and acceptances received from users. Establishment of an affiliation may be initiated by a single communication (e.g., a request) initiated by a given user requesting an affiliation between the given user and one or more other users. Establishment of an affiliation may require a first communication from the given user to be approved by the one or more other users. According to some implementations, group component 118 may establish affiliations intrinsically within the virtual space (e.g., faction-mates are formed based on avatar configuration), through recognized user behavior over time (e.g., raid members or player-versus-player partners), and/or other approaches for establishing affiliations.

Users belonging to an affiliation may have relationships with some or no functional significance, purpose, and/or impact within a given virtual space. Such relationships within the affiliation may include a leadership structure, a role structure, and/or other relationships within the affiliation.

In some implementations, the first group may include a first affiliation. The first affiliation may comprise a persistent group of users within the online game with a relationship having a functional impact on gameplay within the online game. The functional impact on gameplay may include collaborative efforts of the users towards the first common objective. Users within a group, including a temporary group and/or an affiliation, may engage in collaborative gameplay efforts such that the users may communicate, coordinate attacks and/or defenses, coordinate execution of tasks, strategize, and/or otherwise engage in cooperative gameplay as a group. The multiple users in a group engaging in cooperative gameplay towards the one or more common objectives may be able to share virtual goods, services, player characters, and/or items in the online game.

In some implementations, group component 116 may be configured to effectuate presentation of a user interface for receiving the user selected criteria. The user interface may be presented to first user to receive the user selected criteria from the first user. The first user may be able to input the user selected criteria and/or the values of the one or more parameters via the user interface. The values of the one or more parameters may define user values of the parameters associated with users that are eligible to receive an offer to participate in the cooperative gameplay towards the first common objective. The user interface may include one or more input fields for indicating a value, range, selection, option, keyword, description, and/or other input for defining the values of the one or more parameters associated with the users.

Figure 2:
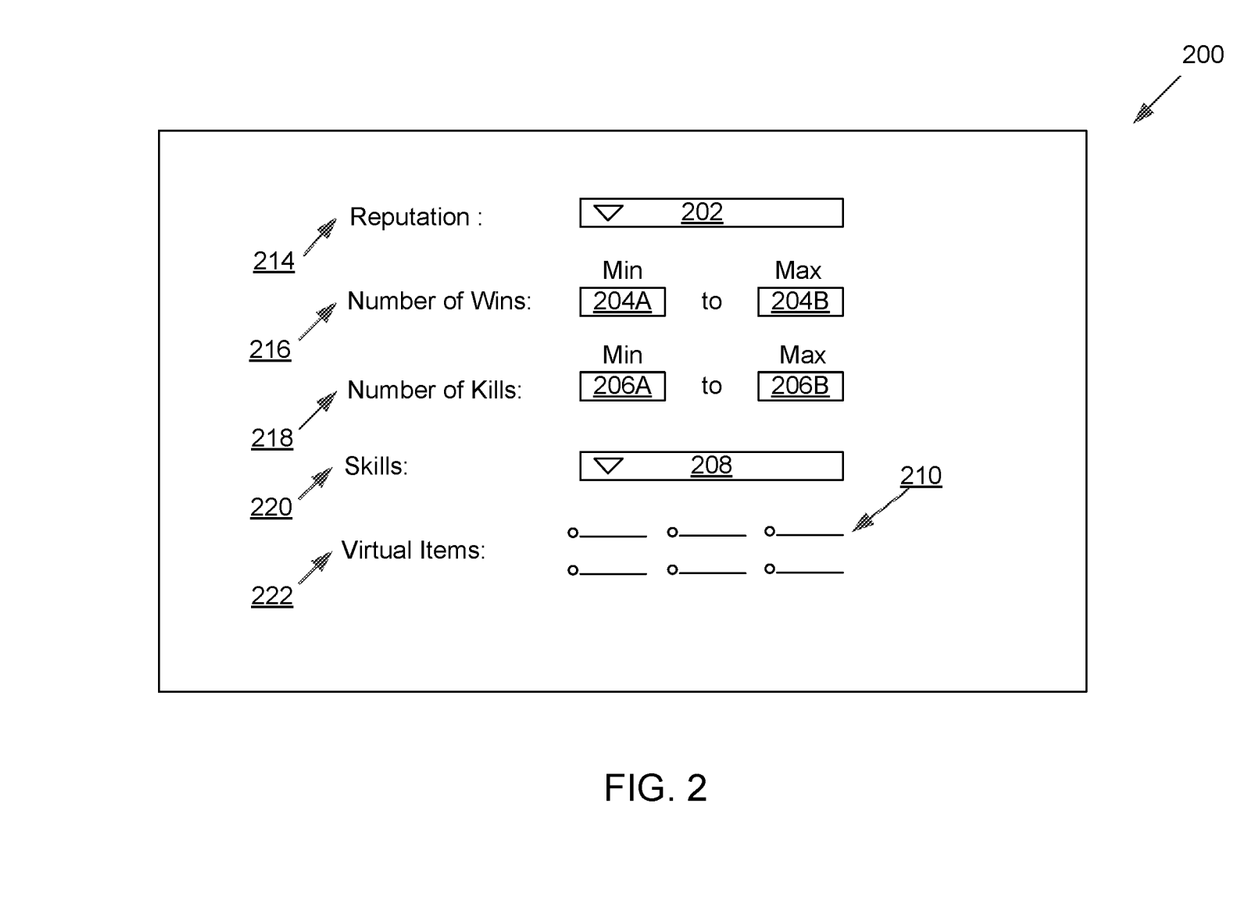
FIG. 2 illustrates an interface for receiving one or more user selected criteria, in accordance with one or more implementations.

FIG. 2 illustrates an interface 200 for receiving one or more user selected criteria, in accordance with one or more implementations. Interface 200 may include one or more input fields 202, 204, 206, 208, 210, 212 and/or other input fields. The input fields 202, 204, 206, 208, 210, 212 may enable a user to input one or more values corresponding to parameters 214, 216, 218, 220, 224 and/or other parameters associated with users.

In some implementations, parameters 214, 216, 218, 220, 224 may be selected by the user and/or may preset by the game provider. The user may select one or more of parameters 214, 216, 218, 220, 224, and/or other parameters, to select corresponding values for via input fields 202, 204, 206, 208, 210, 212. If a user selecting the user selected criteria does not want to restrict users that may be eligible for receiving offers to participate in the cooperative gameplay with the group, the user may leave one or more of the input fields 202, 204, 206, 208, 210, 212 blank. Input fields may include one or more of a drop down list, a list box, a text box, a toggle, a radio button, a checkbox, and/or other input controls.

As illustrated, a user may select a first criteria for parameter 214 by defining, via input field 202, the value required to be eligible to receive an offer to participate in the cooperative gameplay with a given group. Parameter 214 may include a description "Reputation." Input field 202 may include a drop down list and/or a list box for defining the value of the reputation required to satisfy the first criteria. A user may select a second criteria for parameter 216 by defining, via input fields 204, a range of values in which the user values for the corresponding parameter must fall within to be eligible to receive an offer to participate in the cooperative gameplay with the given group. Parameter 216 may include a description "Number of Wins." Input fields 204 may include text boxes for defining the range of wins required to satisfy the second criteria.

A user may select a third criteria for parameter 218 by defining, via input fields 206, a range of values in which the user values for the corresponding parameter must fall within to be eligible to receive an offer to participate in the cooperative gameplay with the given group. Parameter 218 may include a description "Number of Kills." Input fields 206 may include text boxes for defining the range of kills required to satisfy the second criteria. A user may select a fourth criteria for parameter 220 by defining, via input field 208, a value the user value for the corresponding parameter must satisfy (e.g., meet or exceed) to be eligible to receive an offer to participate in the cooperative gameplay with the given group. Parameter 220 may include a description "Skills." Input fields 204 may include a drop down list and/or a list box for defining the skills a user must have to satisfy the second criteria. A user may select a fifth criteria for parameter 222 by defining, via input fields 210, values for one or more virtual items (e.g., text descriptions) for which the user values for the corresponding parameter must satisfy to be eligible to receive an offer to participate in the cooperative gameplay with the given group. Parameter 222 may include a description "Virtual Items." Input fields 210 may include radio buttons for defining the one or more virtual items a user must have to satisfy the fifth criteria.

Returning to FIG. 1, group component 116 may be configured to identify one or more users that satisfy the user selected criteria. Group component 116 may identify users that satisfy the user selected criteria based on information in user accounts. By way of non-limiting example, group component 116 may communicate with user component 114 to obtain parameter information for the users. Group component 116 may identify the users that satisfy the user selected criteria based on one or more of the user values for the user parameters included in the parameter information satisfying one or more values defined by the user selected criteria. Satisfying the one or more values defined by the user selected criteria may include being equal to or greater than the one or more values, corresponding to the one or more values, falling within a range created by the one or more values, and/or otherwise corresponding to the values such that the user selected criteria are fulfilled.

Group component 116 may be configured to effectuate transmission of one or more benefit offers. The benefit offers may be offers to participate in cooperative gameplay with groups towards common objectives. The benefit offers may be transmitted to one or more users that satisfy the user selected criteria. In some implementations, group component 116 may be configured to transmit the benefit offers to the one or more users identified as satisfying the user selected criteria based on the information in the user accounts. The benefit offers may be transmitted to one or more client computing platforms associated with the users. In some implementations, group component 116 may receive selection of one or more of the users identifies as satisfying the user selected criteria. As such, a given user that selects the user selected criteria may select one or more of the users identified as satisfying the user selected criteria to whom to transmit a benefit offer. In some implementations, offers to participate in the cooperative gameplay with the first group towards a first common objective are transmitted to users satisfying the user selected criteria. As such, a first offer to participate in the cooperative gameplay towards the first common objective with the first group may be transmitted to a second client computing platform associated with the second user. The benefit offers may request a user participate in cooperative gameplay with a group towards a given common objective. The users may accept or decline the offers based on whether or not they want to participate in the cooperative gameplay with the group. In some implementations, the benefit offers may include offers to join a temporary group created for the purpose of multiple users participating in cooperative gameplay towards one or more common objectives. In some implementations, the benefit offers may include one or more invitations to join a previously established and/or persistent group within the online game such as an affiliation. The benefit offers may include invitations to join an affiliation full-time and/or long term to participate in cooperative gameplay towards multiple common objectives with the affiliation over time; or invitations to temporarily join an affiliation to participate in the cooperative gameplay towards a given common objective with the affiliation.

The benefit offers may include reward enhancements. The reward enhancements may be for the users. The reward enhancements may increase and/or improve the quantity, quality, and/or value of a reward to be provided to the users. By way of non-limiting example, the reward enhancements may include one or more of a bonus reward, a multiplier, an percentage and/or share of a group reward, an increased level and/or type of reward, a rare reward, a targeted reward, and/or other reward enhancements. In some implementations, the first offer may include a first reward enhancement for the second user.

The bonus reward may include a reward provided to a given user in addition to a standard and/or originally earned reward. A multiplier may include a factor by which a standard and/or original earned reward is multiplied and/or increased. A percentage and/or share of a group reward may include a guaranteed percentage and/or share of an overall reward provided to the group the given user may receive. An increased level or type of reward may increase a level and/or type of a standard and/or original reward earned. A rare reward may include a reward and/or virtual item not easily obtained and/or found within the online game. A targeted reward may include a reward determined for a specific user based on information included in a user account for a specific user. For example, a targeted reward may include a virtual item the user has tried and failed to earn multiple times.

The user selected criteria may be used to recruit one or more players to participate in gameplay with a group. Users having a certain skill, ability, level, influence, and/or record may be recruited via the benefit offers. The reward enhancements may be included in the benefit offers to entice the recruited users to accept the benefit offers and/or to participate in cooperative gameplay with the group. The reward enhancements may be provided to the users responsive to the users accepting the offers to participate in the cooperative gameplay with the group and/or responsive to the users participating in the cooperative gameplay with the group. In some implementations, the reward enhancements may be provided to the one or more users that satisfy the user selected criteria and as consideration for their participation in the cooperative gameplay with the group.

In some implementations, the reward enhancements may be determined by one or more users in the group. Group component 116 may be configured to receive user selections for the reward enhancements. The user selections may include a first user selection for the first reward enhancement. As such that the first reward enhancement may be determined by the first user. In some implementations, group component 116 may be configured to determine one or more reward enhancements based on the values of the one or more parameters associated with the users that satisfy the user selected criteria.

By way of non-limiting example, the user selected criteria may define a player progress metric such that responsive to a given user having 6 XP points and the user selected criteria defining a 5 or more XP points, the given user value (e.g., 6 XP points) may satisfy the value (e.g., 5) defining the user selected criteria (e.g., the user must have a level of XP greater than or equal to the value) such that the given user satisfies the user selected criteria. In some implementations, group component 116 may determine a reward enhancement for the given user based on the given user having a 6 XP points. In some implementations, another user (e.g., group leader, creator, and/or other user) within the group may select the reward enhancement to provide the given user. Continuing the example, the reward enhancement for the given user may include a level 7 sword to be provided to the user in addition to the user's standard reward and/or a 1.5 multiplier that increases the quantity of the user's standard reward by a multiplier of 1.5 (e.g., a 50% increase).

Group component 116 may be configured to receive acceptance information. The acceptance information may indicate acceptances of individual ones of the benefit offers to participate in the cooperative gameplay with the groups towards the common objectives. The acceptances may include acceptances of the benefit offers by users satisfying the user selected criteria. In some implementations, the acceptance information may indicate acceptance of the first offer by the second user.

Responsive to receiving acceptance information indicating an acceptance of an individual benefit offer, group component 116 may be configured to add a user that accepted the individual benefit offer. Adding one or more users to a group may include storing a group association in the user profile information accessed and/or managed by user component 114. As such, responsive to receiving one or more acceptances of benefit offers to participate in cooperative gameplay towards a common objective with a group, group component 116 may form and/or add users to the group.

Wager component 118 may be configured to receive wager information. The wager information may be received from the users (e.g., the client computing platforms associated with the users) participating in the cooperative gameplay with the groups towards the common objectives. The wager information may indicate whether or not the users placed wagers and/or, if the users placed wagers, the amounts of the wagers. The wagers may include amounts of consideration placed at risk based on whether or not the groups will successfully achieve one or more of the common objectives. In some implementations, the wager information may indicate the second user placed a first amount of consideration at risk in a first wager based on whether or not the first group will successfully achieve the first common objective.

One or more users participating in the cooperative gameplay with a given group may place wagers on whether the given group will successfully achieve one or more common objectives. The users may and/or may not be required to place a wager to participate in the cooperative gameplay with a group. In some implementations, the amounts of the wagers may dictate how much of a reward and/or how much a reward enhancement will affect the reward the users participating in the cooperative gameplay with the group may earn responsive to the group successfully achieving one or more of the common objectives.

Game component 112 may be configured to facilitate cooperative gameplay by the users with the groups towards common objectives. Facilitating cooperative gameplay by the users with the groups may include executing a game instance of the game the multiple users within a group may participate in. Game component 112 may perform actions within the game instance requested by the users in the group. Group component 116 may facilitate collaborative efforts of the users in a group towards a common objective by enabling methods of communication among the multiple users in a group; coordinated attacks and/or defenses; coordinated execution of tasks; sharing of virtual resources, player characters, services, and/or virtual items; and/or otherwise facilitating gameplay as a group.

Performance component 120 may be configured to monitor individual performances of the users during their participation in the cooperative gameplay with the groups towards the common objectives. Performance component 120 may be configured to track and/or record performance information associated with the individual performances. Performance component 120 may be configured to communicate with user component 114 to store and/or associate the performance information with individual users. The performance information may include one or more of individual performance statistics (e.g., kills, defeats, attacks, points earned, etc.), individual accomplishments (e.g., resources and/or virtual items earned, levels obtained, etc.), group wins, group losses, and/or other performance information.

The individual performances may be quantified by one or more performance metrics. The performance metrics may comprise and/or be determined based on the performance information. In some implementations, monitoring the individual performances of the users during their participation in the cooperative gameplay with the groups towards the common objectives may include determining performance metrics for individual ones of the users based on the individual performances. By way of non-limiting example, a first performance metric may be determined for the second user based on the performance of the second user during the cooperative gameplay towards the first common objective.

In some implementations, performance component 120 may be configured to rank one or more players within the group based on their performance during the cooperative gameplay. A performance metric may include a rank value.

Reward component 122 may be configured to determine rewards for individual ones of the users. The rewards may be determined based on multiple factors. Reward component 122 may be configured to determine the rewards based on: whether one or more of the common objectives are successfully achieved; the individual performances of the users within the groups; the wager information; the reward enhancements; and/or other factors. Responsive to the users within a group successfully achieving one or more of the common objectives as a group, individual users with the group may receive individual rewards that may be different than one or more other users in the group. The individual reward for a given user within the group may reflect the given user's individual performance, wager information for the given user (e.g., that no wager was placed or a wager amount), and/or the reward enhancement provided to the given user as consideration for their participation in the cooperative gameplay with the group.

In some implementations, responsive to one or more of: the second user satisfying the user selected criteria, the acceptance information indicating acceptance of the first offer by the second user, first wager information being received from the second user, and/or the second user participating in the cooperative gameplay towards the first common objective with the first group, a first reward may be determined for the second user. The first reward may be determined based on whether the first common objective is successfully achieved by the first group, performance of the second user during the cooperative gameplay towards the first common objective with the first group, the first wager information, the first reward enhancement for the second user, and/or other information. As such, the first reward may be determined based on the first performance metric, the first amount of consideration placed at risk in the first wager, the first reward enhancement, and/or other information. As such, user may be enticed to participate in cooperative gameplay with a group to receive a reward enhancement. The user may be encouraged to provide their best efforts during the cooperative gameplay with the group and/or the user may be encouraged to wager on the outcome because the reward they will receive may be affected by one or more of their reward enhancement, their performance, their wager, and/or other information.

By way of non-limiting example, responsive to the first reward enhancement including a multiplier, the second player's performance in the cooperative gameplay being ranked, and/or the second user placing a second amount of consideration at risk in the second wager, the first reward determined for the second player may be determined according to the ranking of the second user and the second wager, multiplied by the multiplier.

The server 102, client computing platforms 104, and/or external resources 128 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which server 102, client computing platforms 104, and/or external resources 128 may be operatively linked via some other communication media.

The external resources 128 may include sources of information, hosts and/or providers of virtual spaces outside of system 100, external entities participating with system 100, external entities for player-to-player communications, and/or other resources. In some implementations, some or all of the functionality attributed herein to external resources 128 may be provided by resources included in system 100.

The server 102 may include electronic storage 126, one or more processors 124, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 126 may comprise electronic storage media that electronically stores information. The electronic storage media of electronic storage 126 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 126 may include one or more virtual storage resources (e.g., cloud storage, a virtual private network, and/or other virtual storage resources). Electronic storage 126 may store software algorithms, information determined by processor 124, information received from server 102, information received from client computing platforms 104, and/or other information that enables server 102 to function as described herein.

Processor(s) 124 is configured to provide information processing capabilities in server 102. As such, processor 124 may include one or more of a digital processor, an analog processor, a digital circuit designed to process information, an analog circuit designed to process information, a state machine, and/or other mechanisms for electronically processing information. Although processor 124 is shown in FIG. 1 as a single entity, this is for illustrative purposes only. In some implementations, processor 124 may include one or more processing units. These processing units may be physically located within the same device, or processor 124 may represent processing functionality of a plurality of devices operating in coordination. The processor 124 may be configured to execute components 112, 114, 116, 118, 120, and/or 122. Processor 124 may be configured to execute components 112, 114, 116, 118, 120, and/or 122 by software; hardware; firmware; some combination of software, hardware, and/or firmware; and/or other mechanisms for configuring processing capabilities on processor 124.

It should be appreciated that although components 112, 114, 116, 118, 120, and/or 122 are illustrated in FIG. 1 as being co-located within a single processing unit, in implementations in which processor 124 includes multiple processing units, one or more of components 112, 114, 116, 118, 120, and/or 122 may be located remotely from the other components. The description of the functionality provided by the different components 112, 114, 116, 118, 120, and/or 122 described above is for illustrative purposes and is not intended to be limiting, as any of components 112, 114, 116, 118, 120, and/or 122 may provide more or less functionality than is described. For example, one or more of components 112, 114, 116, 118, 120, and/or 122 may be eliminated, and some or all of its functionality may be provided by other ones of components 112, 114, 116, 118, 120, 122, and/or other components. As another example, processor 124 may be configured to execute one or more additional components that may perform some or all of the functionality attributed below to one of components 112, 114, 116, 118, 120, and/or 122.

Figure 3:
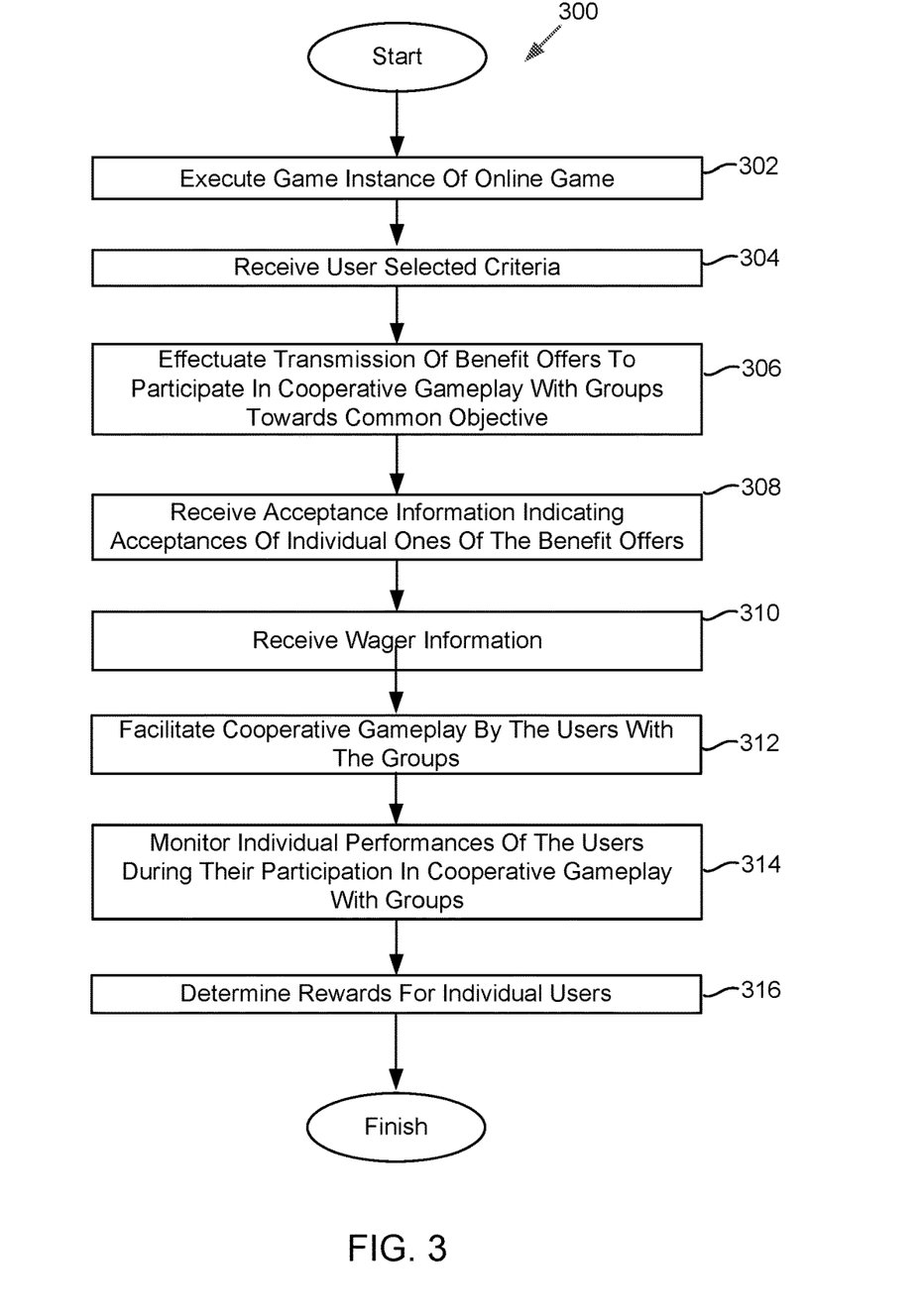
FIG. 3 illustrates a method to facilitate group gameplay in an online game, in accordance with one or more implementations.

FIG. 3 illustrates a method 300 to facilitate group gameplay in an online game, in accordance with one or more implementations. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on electronic storage medium. The one or more processing devices may include one or more devices configured through hardware, firmware, and/or software to be specifically designed for execution of one or more of the operations of method 300.

Referring now to method 300 in FIG. 3, at an operation 302, a game instance of an online game may be executed. The game instance may be used to generate game state information that is transmitted to client computing platforms over a network. The game state information may facilitate presentation of views of the online game to the users via the client computing platforms. Execution of the game instance may includes performing operations in the game instance in response to commands received over the network from the client computing platforms to enable interaction by the users with the online game and/or each other. The online game may include objectives to be accomplished through cooperative gameplay by the users. In some implementations, operation 302 may be performed by a user component the same as or similar to game component 112 (shown in FIG. 1 and described herein).

At an operation 304, user selected criteria may be received. The user selected criteria may be received from a first client computing platform associated with a first user. The first user may belong to a first group within the online game. The user selected criteria may define values of one or more parameters associated with the users. In some implementations, operation 304 may be performed by a group component the same as or similar to the group component 116 (shown in FIG. 1 and described herein).

At an operation 306, transmission of benefit offers to participate in cooperative gameplay with groups towards common objectives may be effectuate. The benefit offers may include reward enhancements. Offers to participate in the cooperative gameplay with the first group towards a first common objective may be transmitted to users satisfying the user selected criteria. As such, a first offer to participate in the cooperative gameplay towards the first common objective with the first group may be transmitted to a second client computing platform associated with the second user. The first offer may include a first reward enhancement for the second user. In some implementations, operation 306 may be performed by a group component the same as or similar to the group component 116 (shown in FIG. 1 and described herein).

At an operation 308, acceptance information may be received. The acceptance information may indicate acceptances of individual ones of the benefit offers to participate in the cooperative gameplay with the groups towards the common objectives. In some implementations, operation 308 may be performed by a group component the same as or similar to the group component 116 (shown in FIG. 1 and described herein).

At an operation 310, wager information may be received. The wager information may be received from the users participating in the cooperative gameplay with the groups towards the common objectives. In some implementations, operation 310 may be performed by a wager component the same as or similar to the wager component 118 (shown in FIG. 1 and described herein).

At an operation 312, the cooperative gameplay may be facilitated. The cooperative gameplay may be facilitated by the users with the groups towards the common objectives. In some implementations, operation 312 may be performed by a game component the same as or similar to the game component 112 (shown in FIG. 1 and described herein).

At an operation 314, individual performances of the users may be monitored. The individual performances of the users may be monitored during their participation in the cooperative gameplay with the groups towards the common objectives. In some implementations, operation 314 may be performed by a performance component the same as or similar to the performance component 120 (shown in FIG. 1 and described herein).

At an operation 316, rewards for individual ones of the users may be determined. The rewards may be determined based on whether the common objectives are successfully achieved, the individual performances, the wager information, the reward enhancements, and/or other information. As such, responsive to the second user satisfying the user selected criteria, the acceptance information indicating acceptance of the first offer by the second user, first wager information being received from the second user, and/or the second user participating in the cooperative gameplay towards the first common objective with the first group, a first reward may be determined for the second user. The first reward may be determined for the second user based on whether the first common objective is successfully achieved by the first group, performance of the second user during the cooperative gameplay towards the first common objective with the first group, the first wager information, and/or the first reward enhancement for the second user. In some implementations, operation 316 may be performed by a reward component the same as or similar to the reward component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate group gameplay in an online game, the system comprising:
   one or more processors configured by machine-readable instructions to:
   execute a game instance of the online game and use the game instance to generate game state information that is transmitted to client computing platforms over a network, the game state information facilitating presentation of views of the online game to users via the client computing platforms, wherein execution of the game instance includes performing operations in the game instance in response to commands received over the network from the client computing platforms to enable interaction by the users with the online game and/or each other, the online game including objectives to be accomplished through cooperative gameplay by the users;
   receive user selected criteria from a first client computing platform associated with a first user, the first user belonging to a first group within the online game, wherein the user selected criteria define values of one or more parameters associated with the users;
   effectuate transmission of benefit offers to participate in cooperative gameplay with groups towards common objectives, the benefit offers including one or more reward enhancements, wherein offers to participate in the cooperative gameplay with the first group towards a first common objective are transmitted to users satisfying the user selected criteria such that a first offer to participate in the cooperative gameplay towards the first common objective with the first group is transmitted to a second client computing platform associated with a second user, the first offer including a first reward enhancement for the second user;
   receive acceptance information indicating acceptances of individual ones of the benefit offers to participate in the cooperative gameplay with the groups towards the common objectives;
   receive wager information from the users participating in the cooperative gameplay with the groups towards the common objectives;
   facilitate the cooperative gameplay by the users with the groups towards the common objectives;
   monitor individual performances of the users during their participation in the cooperative gameplay with the groups towards the common objectives; and
   determine rewards for individual ones of the users based on whether the common objectives are successfully achieved, the individual performances, the wager information, and the one or more reward enhancements, such that responsive to the second user satisfying the user selected criteria, the acceptance information indicating acceptance of the first offer by the second user, first wager information being received from the second user, and the second user participating in the cooperative gameplay towards the first common objective with the first group, a first reward is determined for the second user based at least in part on whether the first common objective is successfully achieved by the first group, performance of the second user during the cooperative gameplay towards the first common objective with the first group, the first wager information, and the first reward enhancement for the second user.

2. The system of claim 1, wherein the one or more processors are further configured by machine-readable instructions to:
   effectuate presentation of a user interface for receiving the user selected criteria from the first user, wherein the first user is able to input the user selected criteria and/or the values of the one or more parameters via the user interface.

3. The system of claim 1, wherein the user selected criteria include one or more of a reputation score, a skill, a level, a quantity of wins, a quantity of kills, an accomplishment, an ability, a resource, a player character, and/or a virtual item associated with the users that are eligible to receive the benefit offers.

4. The system of claim 1, wherein the one or more reward enhancements include one or more of a bonus reward, a multiplier, a percentage and/or share of a group reward, an increased level and/or type of reward, a rare reward, and/or a targeted reward.

5. The system of claim 1, wherein the one or more processors are configured by machine-readable instructions to: receive user selections for the one or more reward enhancements, the user selections including a first user selection for the first reward enhancement such that the first reward enhancement is determined by the first user.

6. The system of claim 1, wherein the one or more processors are configured by machine-readable instructions to: determine the one or more reward enhancements based on the values of the one or more parameters associated with the users that satisfy the user selected criteria.

7. The system of claim 1, wherein monitoring the individual performances of the users during their participation in the cooperative gameplay with the groups towards the common objectives includes determining performance metrics for individual ones of the users based on the individual performances, such that a first performance metric is determined for the second user based on the performance of the second user during the cooperative gameplay towards the first common objective and the first reward is at least partially determined based on the first performance metric.

8. The system of claim 1, wherein the first group is a first affiliation comprising a persistent group of users within the online game with a relationship having a functional impact on gameplay within the online game.

9. The system of claim 1, wherein the first group is a first temporary group formed for a purpose of participating in the cooperative gameplay towards the first common objective.

10. The system of claim 1, wherein the one or more processors are further configured by machine-readable instructions to:
receive a request to form the first group from the first client computing platform associated with the first user;
initiate formation of the first group such that the first user is able to select the user selected criteria and/or one or more characteristics of the first group.

11. The system of claim 1, wherein the wager information indicates whether or not the users placed wagers and/or amounts of the wagers, wherein the wagers include amounts of consideration placed at risk based on whether or not the groups will successfully achieve one or more of the common objectives.

12. The system of claim 11, wherein responsive to the wager information indicating the second user placed a first amount of consideration at risk in a first wager based on whether or not the first group will successfully achieve the first common objective, the first reward is determined based at least partially on the first amount of consideration placed at risk in the first wager.

13. A method configured to facilitate group gameplay in an online game, the method being implemented in a computer system that includes one or more processors configured by machine-readable instructions, the method comprising:
executing a game instance of the online game and use the game instance to generate game state information that is transmitted to client computing platforms over a network, the game state information facilitating presentation of views of the online game to users via the client computing platforms, wherein execution of the game instance includes performing operations in the game instance in response to commands received over the network from the client computing platforms to enable interaction by the users with the online game and/or each other, the online game including objectives to be accomplished through cooperative gameplay by the users;
receiving user selected criteria from a first client computing platform associated with a first user, the first user belonging to a first group within the online game, wherein the user selected criteria define values of one or more parameters associated with the users;
effectuating transmission of benefit offers to participate in cooperative gameplay with groups towards common objectives, the benefit offers including one or more reward enhancements, wherein offers to participate in the cooperative gameplay with the first group towards a first common objective are transmitted to users satisfying the user selected criteria such that a first offer to participate in the cooperative gameplay towards the first common objective with the first group is transmitted to a second client computing platform associated with a second user, the first offer including a first reward enhancement for the second user;
receiving acceptance information indicating acceptances of individual ones of the benefit offers to participate in the cooperative gameplay with the groups towards the common objectives;
receiving wager information from the users participating in the cooperative gameplay with the groups towards the common objectives;
facilitating the cooperative gameplay by the users with the groups towards the common objectives;
monitoring individual performances of the users during their participation in the cooperative gameplay with the groups towards the common objectives; and
determining rewards for individual ones of the users based on whether the common objectives are successfully achieved, the individual performances, the wager information, and the one or more reward enhancements, such that responsive to the second user satisfying the user selected criteria, the acceptance information indicating acceptance of the first offer by the second user, first wager information being received from the second user, and the second user participating in the cooperative gameplay towards the first common objective with the first group, a first reward is determined for the second user based at least in part on whether the first common objective is successfully achieved by the first group, performance of the second user during the cooperative gameplay towards the first common objective with the first group, the first wager information, and the first reward enhancement for the second user.

14. The method of claim 13, further comprising:
effectuating presentation of a user interface for receiving the user selected criteria from the first user, wherein the first user is able to input the user selected criteria and/or the values of the one or more parameters via the user interface.

15. The method of claim 13, wherein the user selected criteria include one or more of a reputation score, a skill, a level, a quantity of wins, a quantity of kills, an accomplishment, an ability, a resource, a player character, and/or a virtual item associated with the users that are eligible to receive the benefit offers.

16. The method of claim 13, wherein the one or more reward enhancements include one or more of a bonus reward, a multiplier, a percentage and/or share of a group reward, an increased level and/or type of reward, a rare reward, and/or a targeted reward.

17. The method of claim 13, further comprising: receiving user selections for the one or more reward enhancements, the user selections including a first user selection for the first reward enhancement such that the first reward enhancement is determined by the first user.

18. The method of claim 13, further comprising: determining the one or more reward enhancements based on the values of the one or more parameters associated with the users that satisfy the user selected criteria.

19. The method of claim 13, wherein monitoring the individual performances of the users during their participation in the cooperative gameplay with the groups towards the common objectives includes determining performance metrics for individual ones of the users based on the individual performances, such that a first performance metric is determined for the second user based on the performance of the second user during the cooperative gameplay towards the first common objective and the first reward is at least partially determined based on the first performance metric.

20. The method of claim 13, wherein the first group is a first affiliation comprising a persistent group of users within the online game with a relationship having a functional impact on gameplay within the online game.

21. The method of claim 13, wherein the first group is a first temporary group formed for a purpose of participating in the cooperative gameplay towards the first common objective.

22. The method of claim 13, further comprising:

receiving a request to form the first group from the first client computing platform associated with the first user;

initiating formation of the first group such that the first user is able to select the user selected criteria and/or one or more characteristics of the first group.

23. The method of claim 13, wherein the wager information indicates whether or not the users placed wagers and/or amounts of the wagers, wherein the wagers include amounts of consideration placed at risk based on whether or not the groups will successfully achieve one or more of the common objectives.

24. The method of claim 23, wherein responsive to the wager information indicating the second user placed a first amount of consideration at risk in a first wager based on whether or not the first group will successfully achieve the first common objective, the first reward is determined based at least partially on the first amount of consideration placed at risk in the first wager.

* * * * *